US012649276B2

(12) United States Patent (10) Patent No.: US 12,649,276 B2

Vier et al. (45) Date of Patent: Jun. 9, 2026

(54) METHOD FOR PRODUCING A 3-DIMENSIONAL OBJECT

(71) Applicant: OTTOBOCK SE & CO. KGAA, Duderstadt (DE)

(72) Inventors: Leonard Vier, Duderstadt (DE); Lars Benjamin Finke, Duderstadt (DE)

(73) Assignee: OTTOBOCK SE & CO. KGAA, Duderstadt (DE)

( * ) Notice: Subject to any disclaimer, the term of this patent is extended or adjusted under 35 U.S.C. 154(b) by 0 days.

(21) Appl. No.: 18/693,277

(22) PCT Filed: Nov. 19, 2021

(86) PCT No.: PCT/EP2021/082362

§ 371 (c)(1),
(2) Date: Mar. 19, 2024

(87) PCT Pub. No.: WO2023/088567

PCT Pub. Date: May 25, 2023

(65) Prior Publication Data

US 2024/0262034 A1 Aug. 8, 2024

(51) Int. Cl.
B29C 64/124 (2017.01)
B29C 64/209 (2017.01)
(Continued)

(52) U.S. Cl.
CPC .......... B29C 64/124 (2017.08); B29C 64/209 (2017.08); B29C 64/245 (2017.08);
(Continued)

(58) Field of Classification Search
CPC ... B29C 64/124; B29C 64/245; B29C 64/209; B29C 64/386; B29C 64/396;
(Continued)

(56) References Cited

U.S. PATENT DOCUMENTS

2014/0048969 A1* 2/2014 Swanson ............... B29C 64/209
264/129
2016/0167312 A1* 6/2016 Feinberg ................ A61L 27/54
264/239
(Continued)

FOREIGN PATENT DOCUMENTS

WO WO-2020069817 A1 * 4/2020 ........... A61F 2/5044

OTHER PUBLICATIONS

Sparrman, Additive Manufacturing, 40 (2021) 101860.

*Primary Examiner* — Andrew L Swanson

(74) *Attorney, Agent, or Firm* — WCF IP

(57) ABSTRACT

A method for producing a 3-dimensional object having a base body which is produced in an additive manufacturing process, in which a base body material in a flowable state is introduced into a support material by at least one insertion needle (10) and cures therein at least partially, wherein the method has the following steps: Providing data of the object to be produced, which contain information about its 3-dimensional shape, determining printing parameters from the data provided, wherein a printing path is determined along which the insertion needle is moved through the support material, and a volumetric flow rate of the base body material inserted into the support material and/or the velocity of the insertion needle at each point along the printing path are determined, producing the base body by means of the additive manufacturing process using the determined printing parameters.

15 Claims, 5 Drawing Sheets

Figure 1:
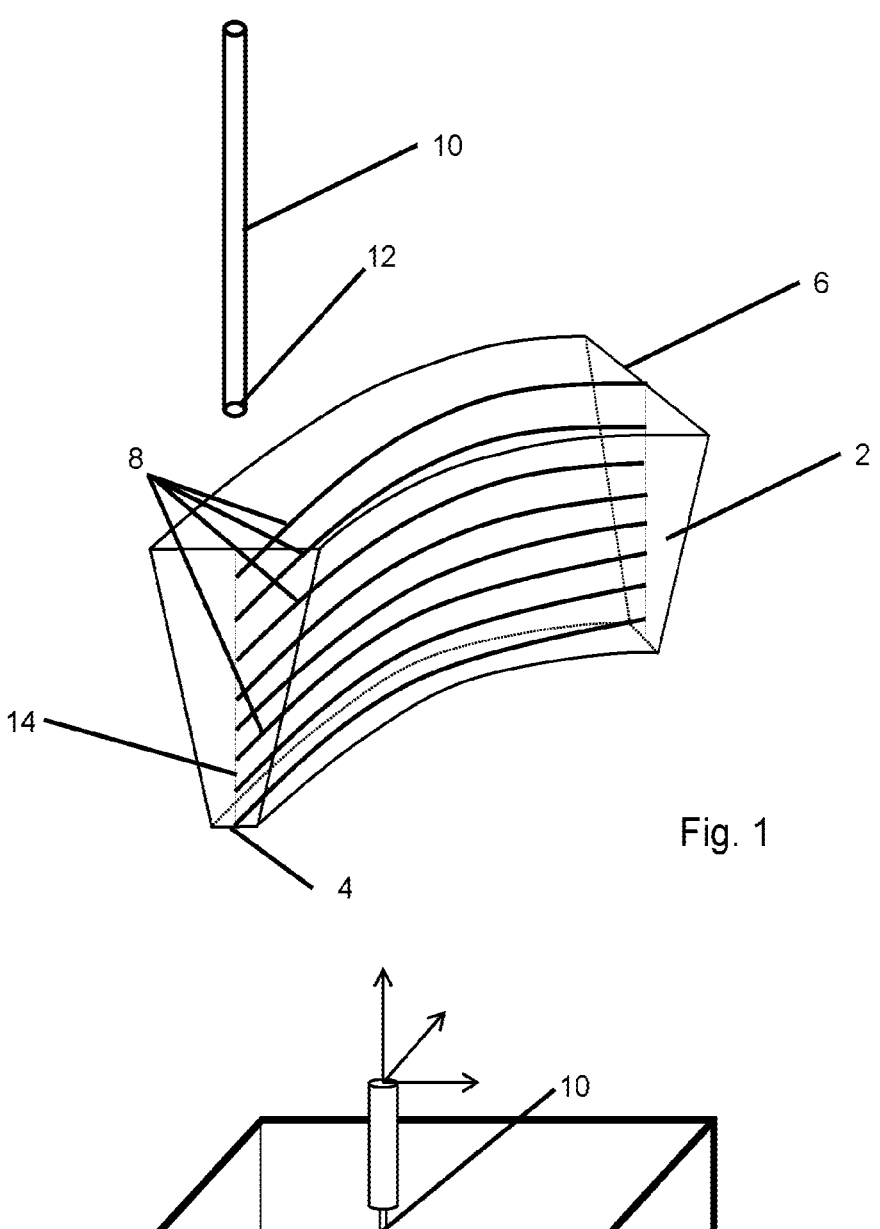

(51) Int. Cl.

| | |
|---|---|
| *B29C 64/245* | (2017.01) |
| *B29C 64/393* | (2017.01) |
| *B33Y 10/00* | (2015.01) |
| *B33Y 30/00* | (2015.01) |
| *B33Y 50/02* | (2015.01) |

(52) U.S. Cl.
    CPC ............. *B29C 64/393* (2017.08); *B33Y 10/00*
        (2014.12); *B33Y 30/00* (2014.12); *B33Y 50/02*
                                                    (2014.12)

(58) Field of Classification Search
    CPC ..... B29C 64/10; B29C 64/106; B29C 64/255;
            B29C 64/259; B33Y 10/00; B33Y 30/00;
                                            B33Y 50/02
    See application file for complete search history.

(56)                   References Cited

U.S. PATENT DOCUMENTS

| | | | | |
|---|---|---|---|---|
| 2018/0057682 | A1* | 3/2018 | Angelini ................ | C09D 11/10 |
| 2018/0243988 | A1* | 8/2018 | Lewicki ................ | B29C 64/245 |
| 2018/0281295 | A1* | 10/2018 | Tibbits ................. | B29C 64/106 |
| 2022/0031480 | A1* | 2/2022 | Bause ....................... | A61F 2/80 |

* cited by examiner

48

METHOD FOR PRODUCING A 3-DIMENSIONAL OBJECT

The invention relates to a method for producing a 3-dimensional object having a base body which is produced in an additive manufacturing process, in which a base body material in a flowable state is introduced into a support material by at least one insertion needle and cures therein at least partially.

Such methods are known from prior art such as an additive manufacturing process developed by the MIT which was published under the key term "rapid liquid printing". In this case, the object to be produced is generated in a container filled with a gel suspension or another material which does not react chemically with the production material, but serves exclusively to mechanically support the production material for as long as it has not yet hardened or sufficiently cross-linked. The gel suspension in this case is the support material. With all of these methods, the production material is processed in a flowable form, for example liquid. With the example of "rapid liquid printing", the production material in liquid or gel form, both of which are considered flowable, is introduced into the gel suspension at the desired positions by means of a positioning device, for example a nozzle that can be moved three-dimensionally. In this way, three-dimensional objects can be "printed" by introducing the production material into the gel suspension at the desired position and in the desired shape, where it is then cures, such as cross-links, solidifies or hardens.

The term "curing" in the following also includes cross-linking or other reactions or changes in the properties of the production material which lead to an increase in dimensional stability or the achievement of a desired condition of the orthopedic device or component. In the case of flexible or elastic materials in particular, the flexibility or elasticity remains intact after hardening. Cross-linking is understood as hardening within the meaning of the invention. The advantage in comparison to conventional 3D printing processes lies, among other things, in the large number of possible production materials, including silicones that cross-links at room temperature and are available on the market. Another advantage is that the process using gel suspension makes it possible to position three-dimensional objects directly in a working space of the printer and not have to build them up layer by layer. Furthermore, the method allows for high production speeds and therefore low production costs.

Base body materials include, for example, silicones and polyurethanes, but also thermoplastic materials, casting resins or other plastics. For a base body material, it is only important that it can be processed and cured in an applicable form, i.e. flowable, for example liquid or otherwise sprayable.

In this way, for example, prosthesis liners, prosthetic gloves, insoles and other orthopedic devices can be produced from conventional silicone easily, quickly and, if necessary, individually shaped. If thermoplastic materials are used, the mechanical stability and hardness resulting from curing may be sufficient to produce, for example, prosthesis sockets, joint protectors or stiffening elements, such as splints for orthopedic devices, in this way using this method. Prosthesis coverings and cosmesis can also be produced in this way. In addition, test prostheses, such as test sockets or test cosmesis, can also be produced.

By using the additive manufacturing process, it is particularly easy to produce, for example, a cosmesis, in particular a foot cosmesis, an ankle cuff or, for example, an individually manufactured patella or an individual knee cap with or without a socket connection. In this way, such an orthopedic device can be designed, for example, to be waterproof and/or with a functionalization, for example with increased mobility by way of a bellows structure in the wrist area of a prosthetic hand.

However, these objects that can be manufactured by such a method have to fulfill a certain set of parameters. They all have the same wall thickness, are pretty limited concerning the structure of the surface that is produced and the geometric forms that are achievable are strongly depending from the insertion needle used.

Furthermore, to prepare production parameters for a conventional additive manufacturing device such as an FDM-printer (FDM: Fused Deposition Modelling), typically a slicer software is used. The software slices the desired representation of the object into layers and determines a printing path within each layer. This is complicated and can lead to undesired mismatches between the initial 3-dimensional data of the object and the determined printing parameters. The produced printing path is not optimal for the rapid liquid printing method since it is restricted to a layer by layer. In the following "layer" and "slice" will be used as synonyms.

The invention aims to solve or at least lighten at least some of these problems.

The invention solves this task by a method as described above that is characterized by the following steps:

providing data of the object to be produced, which contain information about its 3-dimensional shape,
 determining printing parameters from the data provided, wherein
  a printing path is determined along which the insertion needle is moved through the support material, and
  a volumetric flow rate of the base body material inserted into the support material and/or the velocity of the insertion needle at each point along the printing path are determined,
 producing the base body by means of the additive manufacturing process using the determined printing parameters.

First, data of the object is provided. This can be data from a CAD-software (CAD: Computer aided design) that has been used to design and construct the object that is to be produced or it could also be a scan of an existing product that is to be replicated. As long as information about the 3-dimensional shape of the object are contained in the information these can be in any format that can be handled by the device used to perform the method.

From these data a printing parameters are determined which contain a printing path. This is the path, along which the insertion needle is moved through the support material. Usually the base body material is inserted into the support material through an insertion opening of the insertion needle thereby forming a kind of strand. In order to build a wall, for example, several layers of the base body material have to be positioned relative to each other such that these layers are in contact with each other. This can be achieved by a printing path that contains different parts coming close to each other. The distance between two neighbouring of these parts will be called path distance in the following. The path distance can be extracted from the printing path and can be different for different parts and regions of the object that is to be produced.

In contrast to data preparation for classical FDM printing no slicing of the presentation of the product into layers is necessary. The printing path can follow the geometry of the product freely due to the printing in support material. As a consequence the printing path is typically much more correlated to the printed product and it is thus easier to locally change certain aspects like colour or material. It is simply unnecessary to determine a printing path for every slice of the provided data, that is called the presentation of the product or the representation for the product sometimes. If different areas or regions or parts of the product have different parameters than other areas or regions or parts, such as different colours or different material, different materials of materials of different colour have to be used. With a classical FDM printing these different materials have to be used in all the slices that contain data for different areas or regions or parts of the object. This means that different materials or materials of different colour have to be used in a large number of slices, which increases the printing effort.

In contrast the present invention allows for a much more economical printing path since no artificial slicing has taken place. Thus, much fewer changes of the base body material are necessary which leads to a reduced printing effort.

In addition the printing parameters contain information about the volumetric flow rate of the base body material that is inserted into the support material and/or the velocity of the insertion needle at each point along the printing path.

The invention is based on the realization that each of these parameters has an influence on the 3-dimensional shape of the object that is produced in the additive manufacturing process.

A printing path with a smaller path distance will lead to a thicker wall than a printing path with a larger path distance, as long as all other parameters remain the same. When the volumetric flow rate of base body material is increased a thicker wall will be produced and an increase of the velocity of the insertion needle will reduce the wall thickness. These parameters can be modulated in order to modulate the wall thickness of the product to be manufactured.

These parameters also have influence on the structure of the surface of a wall of a base body, such as a prosthetic liner. The smaller the path distance is the smoother the surface of the manufactured wall is. From the provided information about the 3-dimensional shape of the object the printing parameters are determined in order to achieve the desired 3-dimensional shape.

In a preferred embodiment of the invention the base body has, at least in one region, a wall with a wall thickness, a first side and a second side, wherein in order to produce this region, printing parameters are determined in which the base body material introduced by the insertion needle at a point in the printing path forms both the first side and the second side of the wall, wherein preferably the wall thickness is larger than an insertion opening of the insertion needle, preferably between 1,5 times and 10 times the diameter of the insertion opening, most preferably between 2 times and 3,5 times the diameter of the insertion opening. The wall thickness can be affected and set by choosing the path distance and either the volumetric flow rate of the base body material or the velocity of the insertion needle. Of course, it can also be affected and set by choosing the path distance and both the volumetric flow rate and the velocity of the insertion needle. Printing the entire wall thickness in this manner with only one pass of the insertion needle drastically improves the speed of the printing, enables a printing path directly following the geometry of the base body and thus removing the need for slicing the 3-dimensional data and determining printing paths for each slice. It is thus also much easier to link certain aspects of the base body, such as different colours or different materials to locations along the printing path.

Preferably the wall thickness is modulated without changing the volumetric flow rate. A modulated wall thickness means that the thickness of the wall of the object that is to be produced is not constant but varies. Different parts of the wall have different thicknesses. The volumetric flow rate is kept constant in this preferred embodiment since it is much easier to exactly control the printing path and the velocity of the needle.

Hence, in a preferred embodiment of the present invention the wall thickness is modulated by changing the velocity of the insertion needle and/or the printing path with its path distance.

Preferably the printing path follows a mid-line of the wall when the wall is oriented co-linear to the insertion needle and is off-centered from this mid-line else. The insertion needle usually has an end portion at the end of which the insertion opening is located. It is preferably oriented in a vertical direction parallel to the direction of action of gravity. If the orientation of the part of the wall generated by the latest two layers is co-linear to the direction of the end portion of the insertion needle, then the wall is assumed to be oriented co-linear to the insertion needle. Interestingly the inventors have found, that when the wall is not oriented co-linear to the insertion needle it is advantageous when the printing path is off-centered from the mid-line of the wall. It is to be noted that the mid-line of the wall is not necessarily identical with the mid-line of the latest layer of the wall seen from the top.

In a preferred embodiment of the present invention the base body has, at least in one region, a wall with a wall thickness, a first side and a second side, wherein in order to produce this region, printing parameters are determined in which the base body material inserted by the insertion needle at a point in the printing path either forms the first side or the second side of the wall or is completely surrounded by base body material. This is the case when the thickness of the base body is larger than the diameter of the strand of base body material that can possibly be manufactured. In this embodiment of the invention a plurality of strands is needed to achieve the desired wall thickness. These strands are formed when the needle is moved along different parts of the printing path, for example in a meandering or a back and forth movement. One can think of this technique as colouring a surface with a pencil, going back and forth until the complete surface is coloured. This printing strategy can also be advantageous if the printing of sharp edges is desired. On the other hand it is more difficult to achieve smooth rounded surfaces. As noted earlier it is more complicated to adjust the volumetric flow than to adjust the velocity of the printing needle, therefore it is desirable to keep the printing path as continuous as possible avoiding sudden changes of direction and speed. Thus to fill in a certain area it is better to use a printing path formed as a spiral than a simple back and forth movement.

Preferably the printing parameters change for different parts of the base body of the object.

Preferably the determined printing parameters additionally include information about the insertion needle to be used and this changes at least once along the printing path. The different insertion needles can have different diameters of the insertion opening, different numbers of insertion openings and/or different shapes of insertion openings. The opening can have a circular, oval, or polygonal shape.

In a preferred embodiment the volumetric flow rate is zero along at least part of the printing path, so that no base body material is inserted into the support material along this part of the printing path. This part of the printing path can very easily be used to change the insertion needle.

The determined printing parameters can also include information about the base body material used and the base body material that is to be used changes at least once along the printing path. This is particularly interesting if different parts of the object that is to be manufactured are supposed to have different physical parameters, such as mechanical strength and stability, electrical conductivity, heat conductivity and/or the like. Such a change is especially easy to implement while the printed base body material forms both sides of the wall of the object because the deposited material forms the entire part of the object at the current position whereas a printing path following a layer by layer approach might require frequent changes of the base body material if the object consists of multiple materials within the same layer.

In a preferred embodiment a first wall and a second wall are produced from a first base body material and an intervening space is subsequently filled with a second base body material. The two walls can of course by parts of the same wall.

Preferably, the first wall and the second wall are at least partially cured when the space is filled with the second base body material.

It is preferred when the determined printing parameters also include the amount and type of additives added to the base body material along the printing path. These additives can be additives affecting physical and/or chemical parameters of the base body, such as mechanical strength and stability, electrical conductivity, heat conductivity and/or the like. The additives can also be colours and/or pigments. When a base body material is used that comprises two or more components also the mixing ratio of the components can be part of the printing parameters Preferably, at least one of the additives influences a thixotropy of the base body material.

In a preferred embodiment a printing platform is positioned in the support material and the base body material introduced by the insertion needle comes into contact with the printing platform. This means that the base body does not necessarily have to be printed freely in the support material but can be printed such that the base body material gets into contact with the printing platform. The platform can be any object that is rigid enough to withstand the pressure applied to it by the base body material. The platform can be made from metal, wood or plastic. It preferably has a shape that forms the shape of the base body to be printed. This is a fairly easy way to print a base body having a smooth surface at least in the areas, that have been in contact with the printing platform. It is especially helpful to have such a platform at the beginning of the printing path. The beginning is typically less well defined since no existing printing material is already in place with which the new strands could join. A rigid platform can solve this issue by providing suitable boundary conditions.

The invention solves the task in addition by a device for producing a 3-dimenensional object, which is set up for carrying out a process according to any of the embodiments described here.

Figure 2:
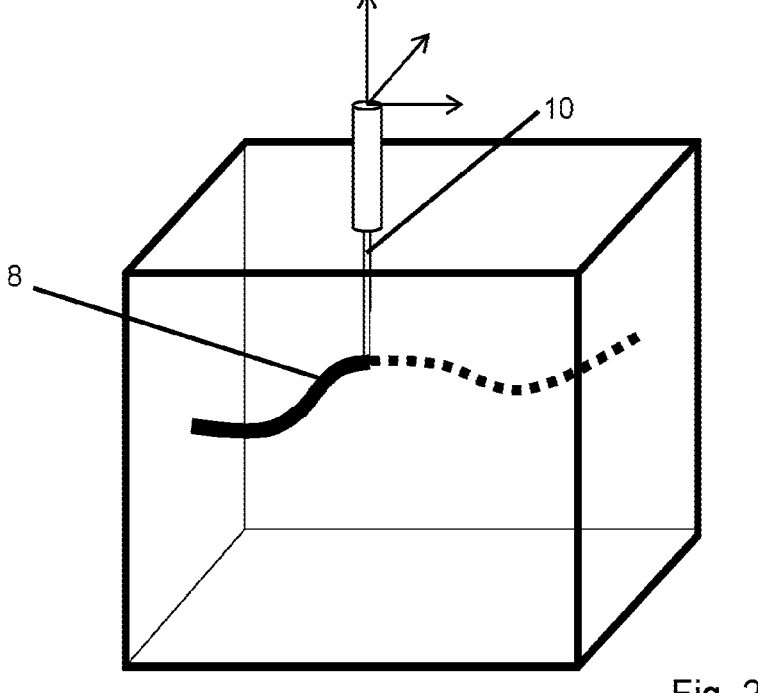
Figures 3, 4:
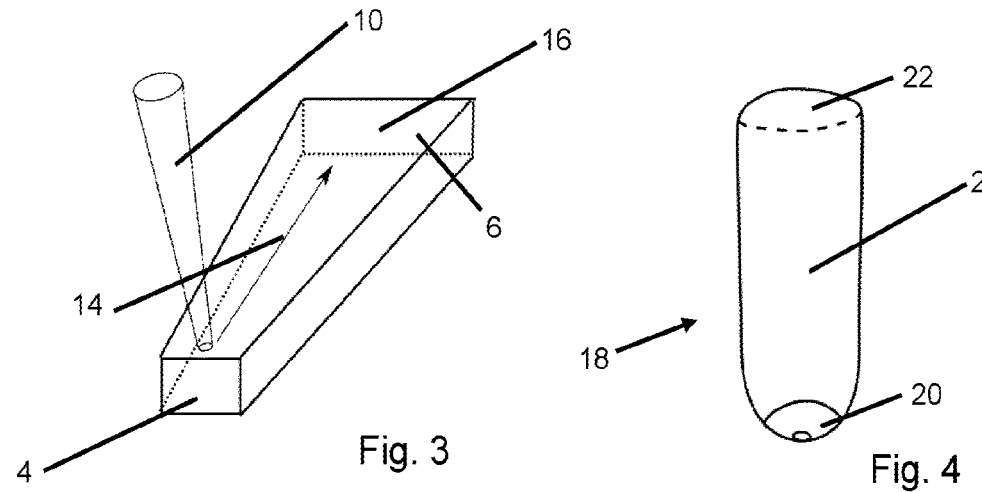
Figure 5:
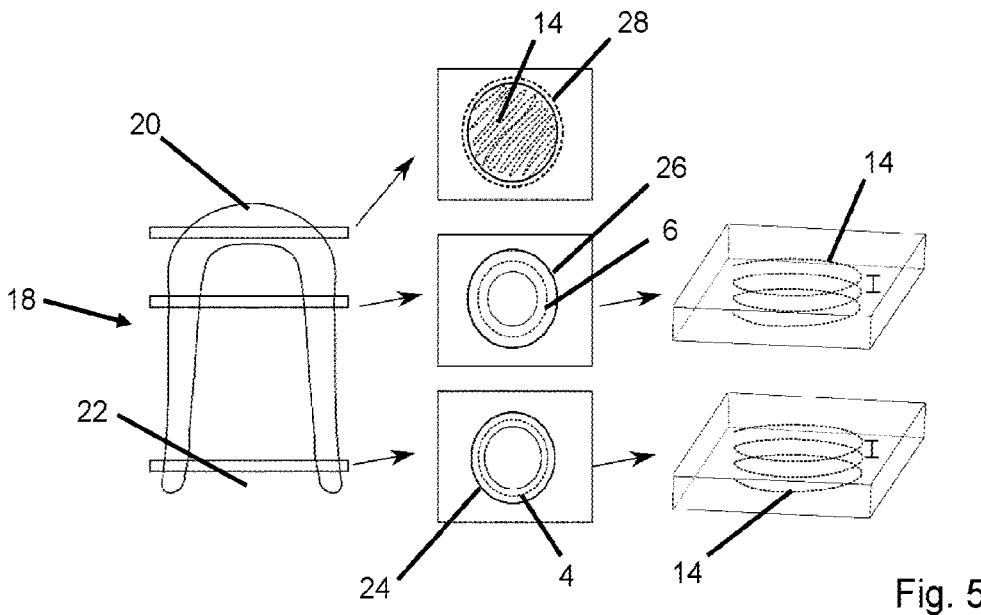
Figure 6:
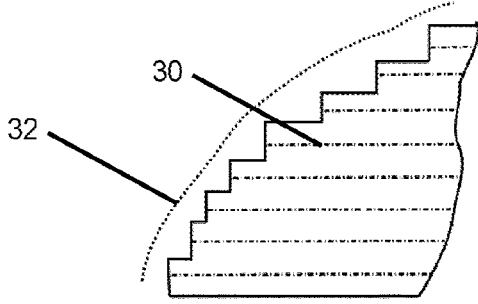
Figure 7:
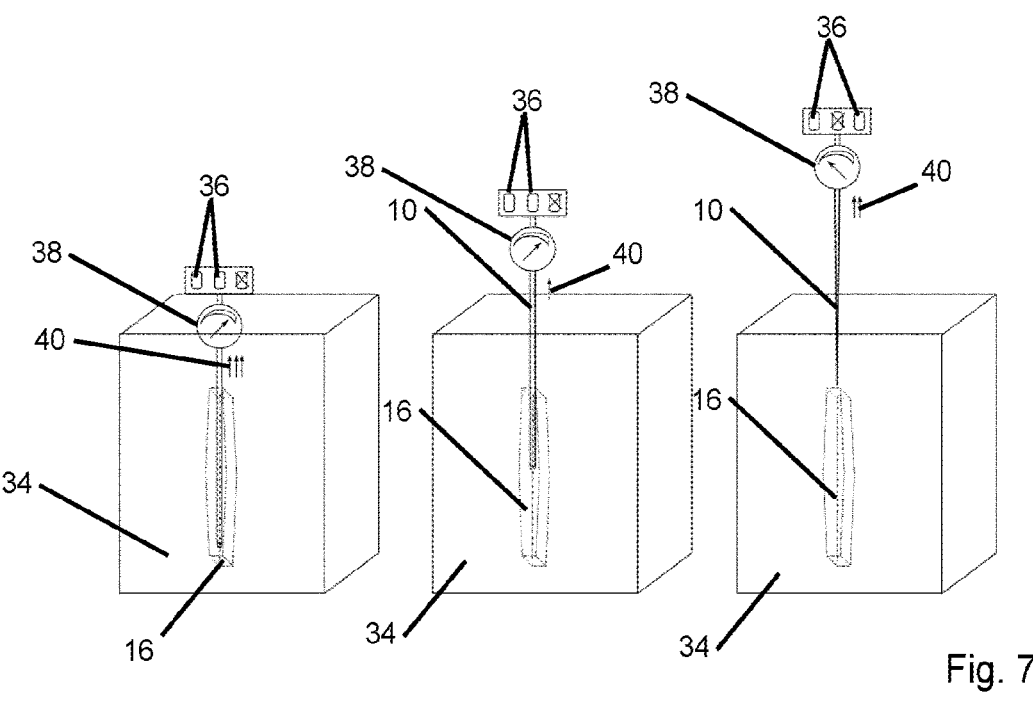
Figure 8:
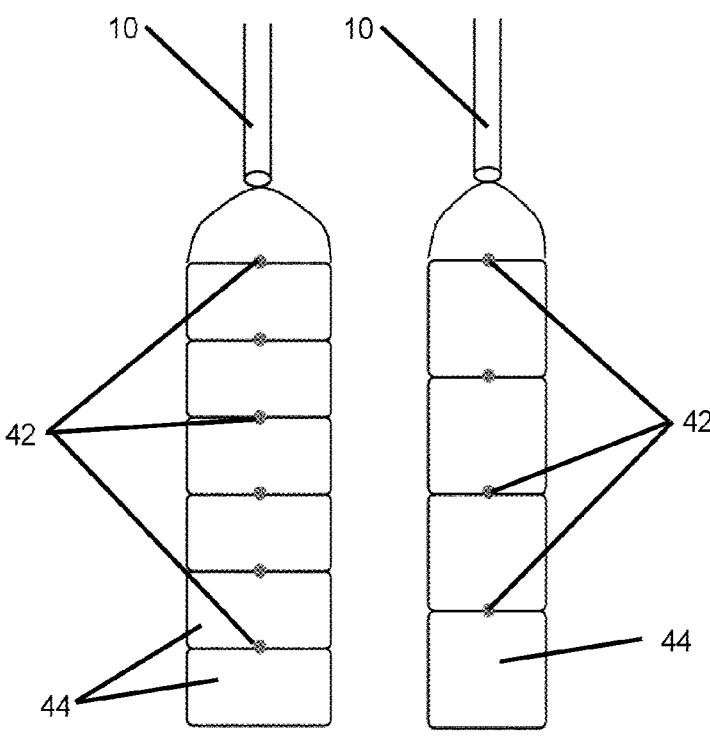
Figure 9:
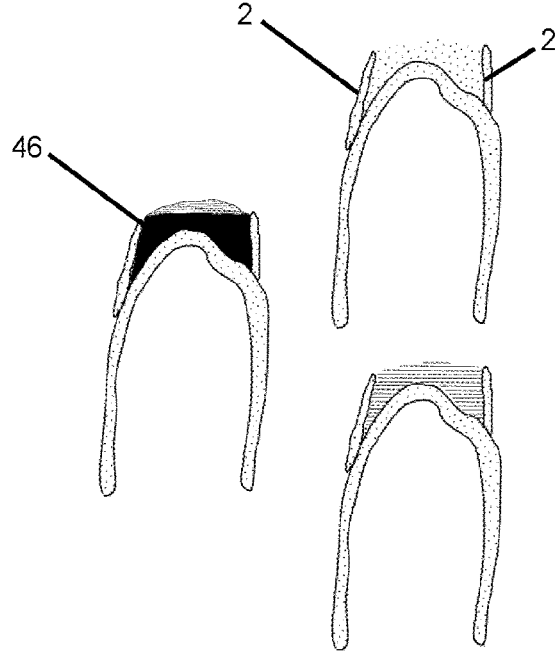
Figure 10:
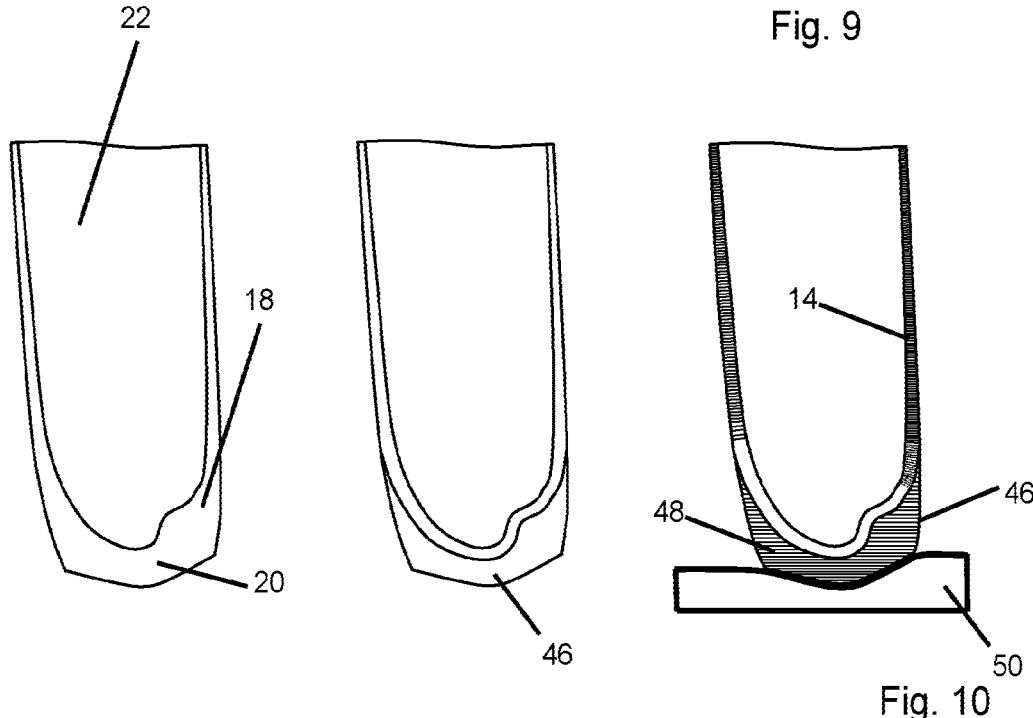
Figure 11:
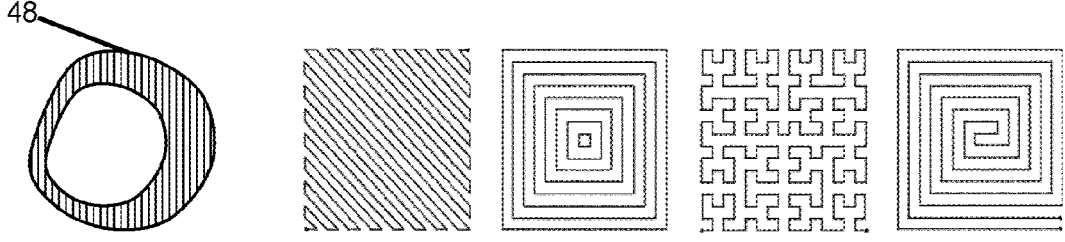

In the following, an example of an embodiment of the present invention will be explained in more detail by way of the attached drawings: They show:

FIG. 1—a schematic depiction of a part of a 3-dimensional object produced using a method according to one embodiment of the present invention FIG. 2—a schematic illustration of the basic principle of the present invention, FIG. 3—a schematic illustration showing details of the method, FIG. 4—a schematic illustration of a liner producible by a method according to an embodiment of the invention, FIG. 5—a schematic of details of the method, FIG. 6—a detail of an object manufactured by a method according to an embodiment of the present invention, FIGS. 7, 8, and 9—different objects that can be produced by the method, FIG. 10—different stages during the method and FIG. 11—different printing path patterns.

FIG. 1 shows a wall 2 which is a part of a 3-dimensional object that is produced using a method according to a first embodiment of the present invention. It has a small thickness 4 at the bottom and a large thickness 6 at the top of the wall. Different parts 8 of a printing path are shown. An insertion needle 10 with an insertion opening 12 is moved along the printing path. During this movement base body material is inserted through the insertion opening 12 into the support material which for the sake of simplicity is not shown. All the parts 8 shown lead along a mid-line of the wall 2, which is illustrated by the mid-plane 14 denoted by the dashed line. The increasing thickness of the wall, can be achieved by reducing the velocity of the insertion needle 10 from part 8 to part 8. The higher the part is located in FIG. 1, the larger is the thickness of the wall and the smaller is the velocity along the respective part 8. In addition or as an alternative one can also increase the volumetric flow rate of the base body material from part 8 to part 8. As one can see in FIG. 8 a path distance is kept constant.

FIG. 2 also shows a part 8 of the printing path. The insertion needle 10 is moved along the part 8 of the printing path and can be moved in three directions within the support material in the container, denoted by three arrows on top of the schematic illustration of the insertion needle 10.

FIG. 3 shows an insertion needle 10 that is moved in the support material along the printing path 14, that is denoted by the arrow. The object 16, that is produced has a small thickness 4 in the front part and a large thickness 6 in the rear part. In order to achieve this only the velocity of the insertion needle 10 is changed in the embodiment shown in FIG. 3. The volumetric flow rate remains unchanged. Usually an object produced in this way will not have edges as sharp as shown in FIG. 3. The FIG. 3 is used to illustrate the relation between the thickness of the object and the velocity of the insertion needle 10 when everything else remains constant.

FIG. 4 shows a liner 18, that can be at least partially produced by a method according to an embodiment of the present invention. It comprises a closed distal end 20 and an open proximal end 22. A wall 2 extends between the distal end 20 and the proximal end 22. The wall 2 may have a varying thickness.

The left part of FIG. 5 schematically shows a sectional view of a liner 18 similar to the shown in FIG. 4. It has a closed distal end and an open proximal end. Compared to FIG. 4 the liner 18 is shown in a top-down arrangement. The center part of FIG. 5 shows three cross-sectional views through the liner 18 at three different positions corresponding to those indicated in the left part of the figure between the distal end 20 and the proximal end 22.

In the first cross-section 24 the wall 2 of the liner 18 has a small thickness 4. In order to produce this part of the liner 18 the printing path 14 is used that is shown in the lowest part of the right part of FIG. 5. It is a helical path generating a tubular object. In the second cross-section 26 the wall 2 of the liner 18 has a large thickness 6, which is larger than the small thickness 4 of the wall 2 shown in the first cross-section 24. The printing path 14 that is used to produce this part of the liner 18 is shown in the upper part of the right part of FIG. 5. It is the same printing path 14 as the one used to produce the wall 2 with the small thickness 4. However, in order to generate the larger thickness 6, the velocity of the insertion needle 10 is reduced. For the third cross-section 28 another printing path 14 is used which is schematically illustrated in the cross-section itself. The printing path 14 for this part of the liner 18 is similar to the printing path of known methods used in FDM-printing methods. To generate a smooth outer surface it can be advantageous to print around the layer with a circular or helical printing pathway so that the outer surface is generate with a printing path similar to the one for the lower parts of the figure.

FIG. 6 shows schematically a combination of an element 30 that is produced using a method according to an embodiment of the present invention with a layer by layer printing path as used in FDM-printing processes. The outer shape of this element comprises a large number of steps corresponding to the layers or slices that are used during the process. Thus, the outer shape of such an object always comprises a lot of edges and stairs and is never smooth. This can be achieved by covering the element 30 with another object, that is produced with a helical printing path typical for the RLP process. The printing path 14 is illustrated by the dotted line 32. The outer surface created using the helical printing path 14 and the inner object created in the layer by layer approach will fuse together if the timing between the two printing operations is adjusted properly. For this it is useful to start printing a layer and then switch to printing one or more turns of the surrounding path according to the dotted line 32. By iterating this procedure the entire object can be created. Combining both printing strategies in this way enables to create an object with a smooth outer surface while at the same time using the layer by layer approach in the inside to generate the necessary overall wall thickness.

FIGS. 7 to 9 show different objects and ways to produce them using a method according to embodiments of the present invention. FIG. 7 shows three different times during the production of the object 16 inside of support material 34. The insertion needle 10 is moved upwards thereby inserting base body material into the support material 34. In the left part of FIG. 7 the lower part of the object 16 is produced. The base body material used is a combination of materials stored in two different reservoirs 36, that are only denoted schematically. The volumetric flow rate, denoted by the measuring instrument 38 is high. The velocity of the insertion needle 10 is illustrated by the number of arrows 40. Here, three arrows 40 are shown, indicating a large velocity. In the center part of FIG. 7 the center part of the object 16 is produced. Again the insertion needle 10 is moved upwards but with a much smaller velocity. Only one arrow 40 is shown. The base body material is still taken from the same two reservoirs 36 as in the left part of FIG. 7 and the measuring instrument 38 still illustrates a high volumetric flow rate of the base body material. This leads to a larger wall thickness of the object 16 in the center part without changing the volumetric flow rate.

This is different in the right part of FIG. 7, in which the situation is shown during which the upper part of the object 16 is produced. The insertion needle 10 has been changed compared to the left and the center part of FIG. 7. The base body material still is a mixture of two materials, but these are taken from a different combination of reservoirs 36. The measuring instrument 38 illustrates a small volumetric flow rate and the velocity of the needle is between the high velocity of the left part and small velocity in the center part of FIG. 7.

FIG. 8 shows how to change the thickness of the wall 2 by changing the printing path 14. The wall 2 is shown in the side view where the insertion needle 10 has started at the dots 42 to print a section. Since each print section 44 runs together with the previous one, they influence each other. This must be taken into account when creating the print path 14. If the volumetric flow rate and the velocity of the insertion needle are kept constant, but the distance between the dots 44 is increased (the total amount of base body material applied is thus reduced), the thickness of the wall 2 changes. This is different from, for example, FDM printing where a larger path spacing would result in a non-contiguous part. If, on the other hand, the volumetric flow rate is adjusted so that the total amount of base body material applied remains the same, the result is an object with the same wall thickness even though the distance between the dots 44 has been changed, but the surface quality (in particular the waviness) changes.

FIG. 9 shows different ways of producing a solid cap 46 of a liner 18 using a process according to an embodiment of the present invention. While the lower (proximal) part of the liner 18 can easily be produced with a printing path 14 that generates both sides of the wall 2 simultaneously the upper (distal) part—i.e. the cap 46—has a thickness, that is too large for this approach. In order to produce the cap 46 different strategies are possible. Shown in the upper right corner is a liner 18 and cap 46 entirely printed with a printing path 14 that generates both sides of the wall 2 denoted by the dotted filling. As mentioned this is difficult or not possible at all due to the large thickness at the distal end of the liner 18. An option is to print the side walls 2 first and then fill the inner structure with the base body material by simply letting it flow into the cup-like structure. This only works if the base body material is made more flowable (less viscous) by adding the thixotropy components to it. If there is a remaining density difference between the base body material and the support material 34, the base body material will slowly flow into the cup-like structure if its viscosity is decreased and the support material 34 will be driven out.

A different approach is combining different printing strategies. It is shown in the left part of the figure. Here the inner surface of the liner 18 is printed using a helical printing path 14 (denoted by the dotted filling). This printing path 14 forms both sides of the wall in one pass. In addition a cup-like structure consisting of the wall 2 is formed with the same printing strategy. Afterwards the liner 18 is removed from the support medium 34 and the cup-like structure is filled with material in a casting process, denoted by the completely filled cap. If desired, the upper part of the cap 46 can be fine-tuned by re-entering the object into the support material 34 and printing the upper part with an FDM like printing path 14 denoted by the horizontal lines.

Alternatively, the liner 18 can be printed as illustrated in the lower right part of the figure. Again the inner surface of the liner 18 is printed with a helical printing path (denoted by the dotted filling). This printing path forms both sides of the wall in one pass. For producing the cap 46, the printing path 14 is alternated between a circular printing path forming the wall 2 and a layer by layer printing path filling the inner part of the cup 46 (denoted by the horizontal lines).

This combination generates a smooth outer surface while also allowing to create the desired thickness of the cap.

FIG. 10 shows different stages during a method according to an embodiment of the present invention. On the left the data of the object 16 to be produced are shown. In this example the object 16 is a liner 18 having a closed distal end 20 and an open proximal end 22. In the center part of FIG. 10 the data has been processed and two different areas have been identified. These correspond to different printing strategies and thus, to different printing paths. The cap 46, which forms the closed distal end will be printed in slices in a layer by layer way. In contrast, the remaining part of the liner will be printed in a helical manner that has already be described.

This is schematically shown in the right part of FIG. 10. The cap 46 and the slices 48 are shown. The lines in the remaining part of the liner illustrate the helical printing path 14. In addition a printing platform 50 is shown. Since the base body material of the lowest slices 48 or layers are in contact with the platform 50, the cap 46 has a smooth contour.

FIG. 11 shows different printing paths 14, that can be used to print a slice 48 of a predetermined shape. The left-most slice 48 has a hole, while the other ones are spares. From left to right the printing paths of the squares are called "direction parallel", "contour parallel", "Hilbert curve" and "Fermat spiral". The choice of the actually used path strongly depends on the shape of the slice 48 that is to be printed.

LIST OF REFERENCE NUMBERS

2 Wall
4 Small thickness
6 Large thickness
8 Part
Insertion needle
12 Insertion opening
14 printing path
16 object
18 liner
20 distal end
22 proximal end
24 first cross-section
26 second cross-section
28 third cross-section
30 element
32 dotted line
34 support material
36 reservoir
38 measuring instrument
40 arrows
42 dot
44 print section
46 cap
48 slice
50 printing platform

The invention claimed is:

1. A method for producing a 3-dimensional object comprising a base body which is produced in an additive manufacturing process, in which a base body material in a flowable state is introduced into a support material by at least one insertion needle and wherein the base body material cures in the support material,
   wherein the base body comprises, at least in one region, a wall with a wall thickness, and wherein the wall comprises a first side and a second side, comprising:

providing data which contain information about a 3-dimensional shape of the 3-dimensional object to be produced,
determining printing parameters from the data provided,
   wherein a printing path is determined along which the at least one insertion needle is moved through the support material, and
   a volumetric flow rate of the base body material inserted into the support material and/or a velocity of the insertion needle at each point along the printing path is or are determined, and
producing the base body by the additive manufacturing process using the determined printing parameters, wherein the support material is a gel and wherein the base body material is a silicone or a polyurethane,
wherein in order to produce the at least one region, the printing parameters which are determined require that the base body material introduced by the insertion needle at a point in the printing path forms both the first side and the second side of the wall, and
wherein the wall is generated by printing a plurality of layers on top of one another where there is a distance between each adjacent layer in the plurality of layers, and wherein at least a portion of the wall thickness is modulated by changing the distance between some of the adjacent layers in the plurality of layers.

2. The method according to claim 1,
wherein the wall thickness is larger than an insertion opening of the insertion needle.

3. The method according to claim 1,
wherein the wall thickness is modulated without changing the volumetric flow rate during the additive manufacturing process.

4. The method according to claim 3,
wherein the wall thickness is also modulated by changing the velocity of the insertion needle and/or the printing path during the additive manufacturing process.

5. The method according to claim 2 wherein the printing path follows a mid-line of the wall when the wall is oriented co-linear to the insertion needle and wherein the printing path is off-centered from the mid-line of the wall when the wall is not oriented co-linear to the insertion needle.

6. The method according to claim 1
wherein in order to produce the at least one region, printing parameters are determined in which the base body material inserted by the insertion needle at another point in the printing path either forms the first side or the second side of the wall or is completely surrounded by base body material.

7. The method according to claim 1 wherein
the printing parameters determined change for different parts of the base body of the object.

8. The method according to claim 1 wherein
the determined printing parameters include information about the at least one insertion needle, and wherein the information about the at least one insertion needle changes at least once along the printing path.

9. The method according to claim 1 wherein
the volumetric flow rate is zero along at least part of the printing path, wherein no base body material is inserted into the support material along the at least part of the printing path where the volumetric flow rate is zero.

10. The method according to claim 1 wherein
the determined printing parameters include information about the base body material, and wherein the information about the base body material changes at least once along the printing path.

US 12,649,276 B2

11

11. The method according to claim 10, wherein
a first wall and a second wall are produced from a first
base body material and wherein an intervening space
between the first wall and the second wall is subse-
quently filled with a second base body material.

12. The method according to claim 11, wherein
the first wall and the second wall are at least partially
cured when the intervening space is filled with the
second base body material.

13. The method according to claim 1 wherein
the determined printing parameters include an amount and
a type of additives added to the base body material
along the printing path.

14. The method according to claim 13, wherein
at least one additive influences a thixotropy of the base
body material.

15. The method according to claim 1 further comprising
positioning a printing platform in the support material, and
wherein the base body material introduced by the insertion
needle comes into contact with the printing platform.

12

* * * * *